Feb. 27, 1962 W. N. CARROLL ET AL 3,022,945
HIGH-SPEED COUNTER
Filed Dec. 21, 1959
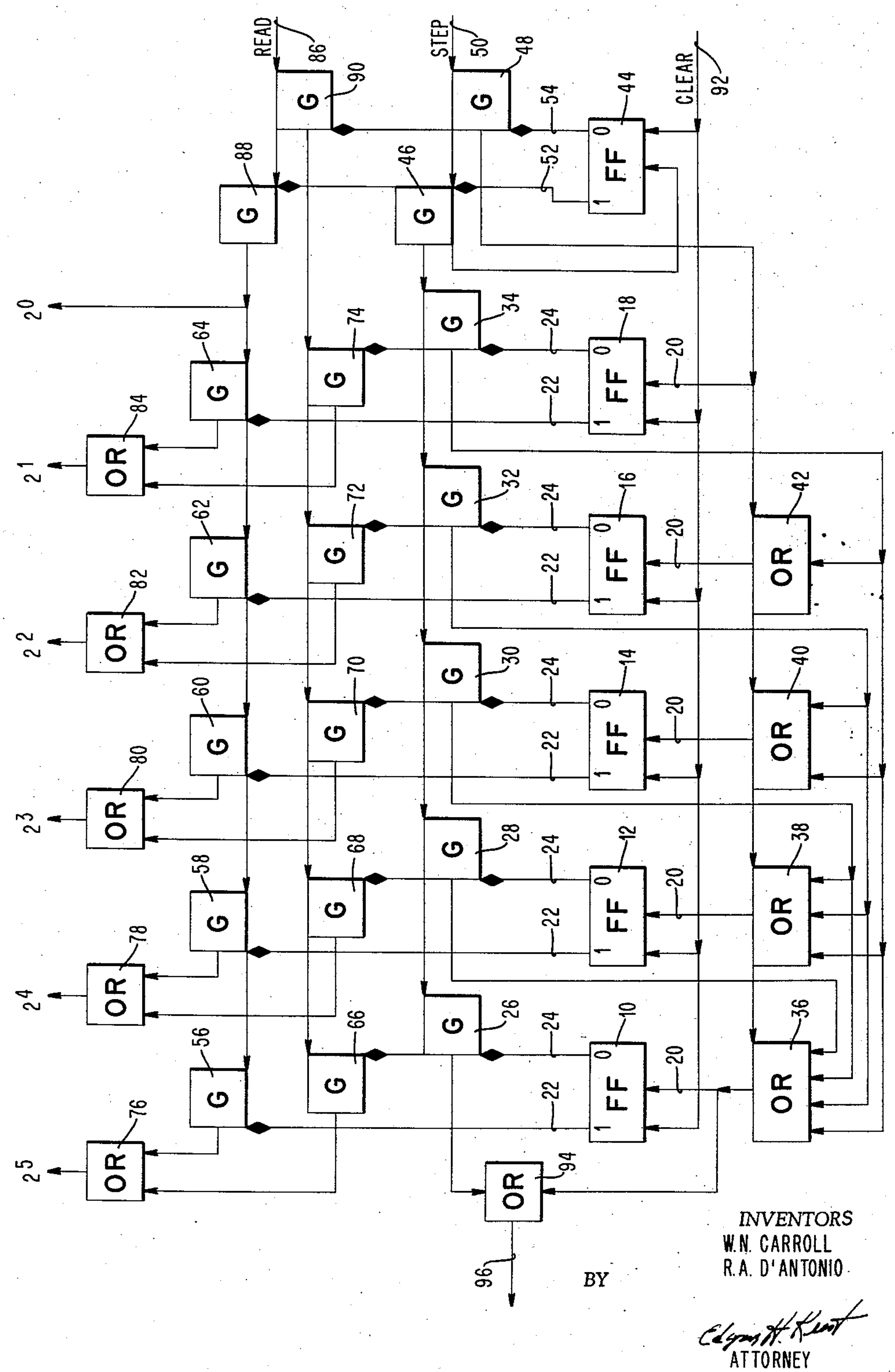
INVENTORS
W.N. CARROLL
R.A. D'ANTONIO
BY
Edgar H. Kent
ATTORNEY United States Patent Office 3,022,945

Patented Feb. 27, 1962

3,022,945

HIGH SPEED COUNTER

William N. Carroll, Rhinebeck, and Renato A. D'Antonio, Kingston, N.Y., assignors to International Business Machines Corporation, New York, N.Y., a corporation of New York Filed Dec. 21, 1959, Ser. No. 861,027
15 Claims. (Cl. 235—92)

This invention relates to electronic counting circuitry and more particularly to an improved high-speed counting apparatus suitable for use in conjunction with high-speed electronic digital computer systems. Digital computers require a variety of apparatus for handling and manipulating the data they are adapted to process and counter apparatus find frequent use in such systems. In typical high-speed counters of the prior art, a delay in counting speed was caused by the rippling of a sensing signal through a plurality of carry gates. This carry gate propagation delay produced a significant increase in the time required for the counter to complete the operation, an increase in time which was a direct function of the number of stages in the counter and type of gate employed therein. Another cause of delay was the time required for each storage element to shift from one setting to another in the recording of the changed count. These delays are cumulative in nature and dictated that the design of the associated circuitries must insure sufficient time for the counter to completely resolve following the longest possible operation of which it was capable prior to utilizing the results thereof. Accordingly, as it is necessary to reduce the requisite operating time of such apparatus in order to achieve higher overall operating speeds, it is an object of this invention to provide an improved electronic counter apparatus capable of substantially higher speed operation than comparable counters of the prior art.

Another object of the invention is to provide a high-speed counter circuit in which time delays due to gate operation during carry propagation are substantially eliminated.

Still another object of the invention is to provide a high-speed counting apparatus in which the condition of each device utilized for storing a digit of count is changed only once, at most, during each counting operation.

In accordance with the invention there is provided a binary counter which includes a storage register having a plurality of stages that is adapted to hold a number representative of a count in either the true or the complement form. A control means is incorporated which provides an indication of whether the number stored in the register is odd or even and controls the application of a stepping signal to the counter. The control means channels the stepping signal alternately to complement all the stages of the register above the least significant stage that contains the value Zero when the number stored in the register is odd and to complement all the stages above the least significant stage that contains the value One when the number is even, thereby effectively adding One to the number stored in the register during each stepping operation. The count held in the apparatus is alternately in normal and in complement form. Under these circumstances the value in the lowest stage is always the same and a storage device for this value thus is not required. This counter operates with only a single complementing operating of the storage devices, at most, during each stepping operation and all delays due to rippling through a series of gates are eliminated as each stepping signal is applied substantially simultaneously to all necessary gates in the register sampling operations. The storage devices are also complemented substantially simultaneously in a similar fashion. Read out of this apparatus is under the supervision of the control means and it is arranged so that the value of the number stored in the counter is always available in true binary form. The circuitry has extremely high counting speed and is simple and straight-forward in construction and in operation. It provides particular advantages where a large number of digits are involved in the numbers to be counted.

Other objects and advantages of the invention will be seen as the following description of a preferred embodiment thereof progresses in conjunction with the drawing which shows a logical block diagram of the electronic counter circuitry according to the preferred embodiment of the invention.

In this figure a conventional filled in arrowhead is employed on lines to indicate (1) a circuit connection, (2) energization with a pulse and (3) the direction of pulse travel. A diamond-shaped arrowhead indicates (1) a circuit connection, (2) energization with a D.C. level, and (3) the direction of application of that level. Bold-face characters appearing within a block identify the common name of the circuit represented, that is, FF designates a flip-flop, G a gate circuit, and OR a logical OR circuit. A variety of circuits suitable for the performance of each of these functions is known in the art. However, the preferred type of components are disclosed in the copending application S.N. 824,119 filed in the name of Carroll A. Andrews et al. on June 30, 1959, and entitled Magnetic Core Transfer Matrix.

With reference to the drawing there is provided a storage register comprising the flip-flop 10, 12, 14, 16 and 18. This register is a binary counting device adapted to store the signals representative of the number with the exception of the least significant bit of that number. Each of the flip-flops has a complement input 20 and two outputs, designated herein a One output 22 and a Zero output 24. A pulse applied to a complementing input of a flip-flop switches the flip-flop to the opposite state so that the conditioning level is removed from one output line and transferred to the other. A set of gates 26, 28, 30, 32 and 34 are conditioned by the Zero output levels of the corresponding flip-flops in the storage register. OR circuits 36, 38, 40 and 42 are associated with the complement inputs of flip-flops 10, 12, 14 and 16 respectively.

A control circuit is provided comprising a flip-flop 44 and gates 46 and 48. This control circuit is arranged to provide an indication of whether the number stored in the counter is odd or even and appropriately channels a stepping pulse applied on line 50 to increase the value stored in the counter by One. Gate 46 is associated with the One output 52 of the control flip-flop and gate 48 with the Zero output 54.

A read out circuit is associated with the counter register and included two sets of gates. One set, gates 56, 58, 60, 62 and 64, is conditioned by the One output levels of the associated register flip-flops and the other set, gates 66, 68, 70, 72 and 74, is conditioned by the Zero output levels of the register flip-flops. The outputs of the gates in the two sets that are conditioned by levels from the same flip-flop are applied through an associated OR circuit, 76, 78, 80, 82 and 84 respectively, as indications of the value stored in the counter. The sets of gates are sampled by a read pulse applied on line 86 which is channeled to one set or the other by gates 88 and 90 which are conditioned by the output levels 52 and 54 respectively of the control flip-flop 44.

Initially the counter is reset by a signal on the clear line 92 which clears the control flip-flop 44 to Zero and sets each flip-flop in the counter register to One. A stepping pulse subsequently applied on line 50 samples gates 46 and 48 and as the control flip-flop is set to Zero this pulse is passed by gate 48 on line 52 to complement all the flip-flops in the counter. The stepping pulse also complements the control flip-flop. The number now stored in the counter is binary One in true form as all the flip-flops are Zero and One is implied by the missing FF. Signals indicative of this value are read out when a pulse is applied on line 86. As the control flip-flop 44 is now in the One state, gate 88 is conditioned and the read pulse is passed to provide an output signal on the $2^0$ line (the least significant) and to sample gates 56, 58, 60, 62 and 64. As all the register flip-flops are cleared to Zero, none of the gates are conditioned and the signals applied on the read out lines are as follows:

| $2^5$ | $2^4$ | $2^3$ | $2^2$ | $2^1$ | $2^0$ |
|---|---|---|---|---|---|
| 0 | 0 | 0 | 0 | 0 | 1 |

As soon as the flip-flops have resolved a second step pulse can be applied to the counter. This pulse samples gates 46 and 48 and is passed by gate 46 to simultaneously sample gates 26, 28, 30, 32 and 34. The least significant flip-flop which conditions a gate is flip-flop 18 and thus gate 34 passes the stepping pulse to OR circuit 42 to complement flip-flop 16, to OR circuit 40 to complement flip-flop 14, to OR circuit 38 to complement flip-flop 12, and to OR 36 to complement flip-flop 10. It will be noted that the stepping pulse is also passed by gates 26, 28, 30 and 32 for application to certain of the OR circuits but as the pulses are applied to the OR circuits substantially simultaneously, the signals applied to the complement inputs of the flip-flops effect only a single change of state of each flip-flop.

The number now stored in the counter is Two in complement form. The flip-flops in the register indicate the following binary value:

| 10 | 12 | 14 | 16 | 18 |
|---|---|---|---|---|
| 1 | 1 | 1 | 1 | 0 |

It may be noted that this represents the binary value Two in complement form if a One is implied in the least significant order. The true value is immediately available and is read out by a pulse on line 86 which is passed by conditioned gate 90 to sample gates 66, 68, 70, 72 and 74. The signals applied on the read out lines are as follows:

| $2^5$ | $2^4$ | $2^3$ | $2^2$ | $2^1$ | $2^0$ |
|---|---|---|---|---|---|
| 0 | 0 | 0 | 0 | 1 | 0 |

Subsequent stepping operations follow the same pattern. The following table indicates the status of the storage register flip-flops and the read out signals for several numerical values:

| Numerical value | Storage register | Implied bit $2^0$ | Read out | | | | | |
|---|---|---|---|---|---|---|---|---|
| | | | $2^5$ | $2^4$ | $2^3$ | $2^2$ | $2^1$ | $2^0$ |
| 1 | 00000 | 1 | 0 | 0 | 0 | 0 | 0 | 1 |
| 2 | 11110 | 1 | 0 | 0 | 0 | 0 | 1 | 0 |
| 3 | 00001 | 1 | 0 | 0 | 0 | 0 | 1 | 1 |
| 4 | 11101 | 1 | 0 | 0 | 0 | 1 | 0 | 0 |
| 5 | 00010 | 1 | 0 | 0 | 0 | 1 | 0 | 1 |
| 6 | 11100 | 1 | 0 | 0 | 0 | 1 | 1 | 0 |
| 7 | 00011 | 1 | 0 | 0 | 0 | 1 | 1 | 1 |
| 8 | 11011 | 1 | 0 | 0 | 1 | 0 | 0 | 0 |
| 9 | 00100 | 1 | 0 | 0 | 1 | 0 | 0 | 1 |
| 10 | 11010 | 1 | 0 | 0 | 1 | 0 | 1 | 0 |

It will be seen that the signals stored in the register, if the number is odd, are representative of the true binary value of the count and if the number is even, are representative of the complement of that binary value. It will be noted that the least significant stage ($2^0$) under these conditions would always contain the binary value One. Hence no flip-flop is necessary and none is provided. The control flip-flop is utilized in the preferred embodiment to indicate whether the value stored in the counter is in true or complement form and provides the proper output indication on the line via gate 88 during read out. When the count is odd, the control flip-flop has been set to the One state, and when the count is even, the control flip-flop has been cleared to the Zero state.

Thus the counter constructed in accordance with principles of the invention enables extremely rapid operation with the count stored therein having substantially immediate availability. Delays due to carry gate propagation are eliminated. The state of the register elements storing the count is changed by a single simultaneous complementing operation and only one complementing operation is required to increase the count stored in the register by One. While a preferred embodiment of the invention has been shown and described, various modifications thereof will be obvious to those having ordinary skill in the art and it will be understood that the invention is not intended to be limited thereto or to details thereof and departures may be made therefrom within the spirit and scope of the invention as defined in the claims.

We claim:

1. A high-speed electronic counting apparatus comprising a storage register having a plurality of stages, said storage register being adapted to hold signals representative of the digits above the least significant digit of the count stored in said apparatus, control means for indicating whether the count stored in said apparatus is in true or in complement form, means to apply counter stepping pulses to said apparatus, each pulse being adapted to increase the count stored therein by one, said control means being adapted to channel said stepping pulses to complement all the stages in said register when the count stored in said apparatus is in complement form and to complement all the stages in said register above the lowest stage which contains a signal representative of the value zero when the count is in true form so that the number stored in said apparatus is alternately in true and in complement form.

2. The apparatus as claimed in claim 1 and further including means to apply a read out signal to sample said counting apparatus for reading out the count stored therein in true binary form.

3. A high-speed electronic counting apparatus comprising a storage register having a plurality of stages, said storage register being adapted to store signals representative of those values of the binary count held in said apparatus that are greater than the value in the least significant order of that count, a bistable device associated with each stage, each bistable device having at least a complement input and first and second outputs, a set of gates associated with said storage register and corresponding in number to stages therein, each gate being conditioned by the first output of the storage register bistable device associated therewith, a control circuit adapted to indicate whether the count stored in said apparatus is in true or in complement form, means to apply a stepping pulse to said apparatus, said stepping pulse being applied to said register in accordance with the indication of said control circuit such that said stepping pulse complements all the devices in said register when the count stored in said apparatus is in complement form and complements all the devices above the least significant device having an active first output when the count is in true form so that the number stored in said counter is alternately in true and in complement form.

4. The apparatus as claimed in claim 3 and further including means for reading out signals representative of the count held in said apparatus comprising a first set of gates associated with the first outputs of said register devices and a second set of gates associated with the second outputs of said register devices, and means to apply a sampling pulse to one set of gates in accordance with the indication of said control circuit to provide output signals representative of the count stored in said apparatus.

5. A high-speed electronic counting apparatus comprising a storage register having a plurality of stages adapted to hold signals representing the digits above the least significant digit in a number in binary form, control means for indicating whether the count stored in the apparatus is odd or even, and means to apply counter stepping signals to the storage register each adapted to increase the value of the number stored in said apparatus by one in accordance with an indication provided by said control means alternately to complement all the stages above that stage which contains the first binary zero if the number stored in the apparatus is odd and to complement all the stages if the number is even, thereby effectively adding one to the number stored in the apparatus by each stepping signal.

6. The apparatus as claimed in claim 5 and further including means to apply a read out signal to sample said storage register in accordance with the indication provided by said control means to read out signals representative of the number stored in said apparatus.

7. A high-speed electronic counting apparatus comprising a first means having a plurality of stages for holding binary signals representative of the digits above the least significant digit of a number, a second means coupled to said first means and responsive to a signal for reading out signals representative of the number held as signals in said first means in true form, and means for changing the signals representative of a number held in said first means to modify that number by One including control means responsive to a stepping pulse adapted to alternately complement all the stages above the least significant stage that contains a binary value Zero and complement all of said stages.

8. The apparatus as claimed in claim 7 wherein said second means includes alternately operative means responsive to said control means for directly reading out the signals held in said first means and for complementing the number represented by the signals held in said first means.

9. A high-speed electronic counting apparatus comprising a storage register having a plurality of stages and a flip-flop associated with each stage, said storage register being adapted to store signals representative of binary count orders greater than the least significant order, each flip-flop having at least a complement input and first and second outputs, an apparatus stepping control circuit comprising a flip-flop having at least a complement input and first and second outputs, a set of gates associated with said storage register and corresponding in number to the stages therein, each gate being conditioned by the first output of the storage register flip-flop associated therewith, means to apply a stepping signal to said apparatus to sample said control flip-flop and then to complement said control flip-flop, said control flip-flop being adapted alternately to channel said stepping pulse to complement all the flip-flops in said storage register and to sample said set of gates for complementing all the flip-flops in said register above the least significant flip-flop that has a first output level.

10. The apparatus as claimed in claim 9 and further including means for reading out signals representative of the number held in said storage register comprising a first set of gates associated with the first outputs of said register flip-flops and a second set of gates associated with the second outputs of said register flip-flops, and means to apply a reading pulse to one of said sets of gates in accordance with the status of said control flip-flop to read out the signals representative of the number stored in said register.

11. A high-speed electronic binary counting apparatus, including a plurality of bistable devices, arranged to form a corresponding plurality of stages of a multistage counter, said counter being adapted to hold signals representative of the digits above the least significant digit of a binary number, and counter stepping means adapted to increase the number held in said counter by One in response to each counter stepping signal, including means adapted to cause said stepping signal to alternately actuate means responsive to signals produced by said bistable devices for producing a signal adapted to complement all the bistable devices above the least significant stage that contains a binary Zero and means for complementing all the bistable devices in said counter.

12. A high-speed electronic counting apparatus comprising a storage register having a plurality of stages, said storage register being adapted to store signals representative of those values of the binary count held in said apparatus that are greater than the value in the least significant order of that count, a bistable device associated with each stage, each bistable device having at least a complement input and first and second outputs, a set of gates associated with said storage register and corresponding in number to stages therein, each gate being conditioned by the first output of the storage register bistable device associated therewith, a control circuit adapted to indicate whether the count stored in said apparatus is in true or in complement form, means to apply a stepping pulse to said apparatus, said stepping pulse being applied to said register in accordance with the indication of said control circuit such that said stepping pulse alternately complements all the devices in said register and complements all the devices above the least significant device having an active first output so that the number stored in said counter is alternately in true and in complement form.

13. The apparatus as claimed in claim 12 and further including means for reading out signals representative of the count held in said apparatus comprising a first set of gates associated with the first outputs of said register devices and a second set of gates associated with the second outputs of said register devices, and means to apply a sampling pulse to one set of gates in accordance with the indication of said control circuit to provide output signals representative of the count stored in said apparatus.

14. A high-speed electronic counting apparatus comprising a storage register having a plurality of stages adapted to hold signals representing the digits above the least significant digit in a number in binary form, control means for indicating whether the count stored in the apparatus is odd or even, and means to apply counter stepping signals to the storage register each adapted to change the value of the number stored in said apparatus by one in accordance with an indication provided by said control means alternately to complement all the stages above that stage which contains the first binary zero and to complement all the stages in said storage register, thereby effectively modifying the number stored in the apparatus by one in response to each stepping signal.

15. The apparatus as claimed in claim 14 and further including means to apply a read out signal to sample said storage register in accordance with the indication provided by said control means to read out signals representative of the number stored in said apparatus.

References Cited in the file of this patent

UNITED STATES PATENTS

| | | |
|---|---|---|
| 2,848,166 | Wagner | Aug. 19, 1958 |
| 2,880,934 | Bensky et al. | Apr. 7, 1959 |

UNITED STATES PATENT OFFICE

CERTIFICATE OF CORRECTION

Patent No. 3,022,945 February 27, 1962

William N. Carroll et al.

It is hereby certified that error appears in the above numbered patent requiring correction and that the said Letters Patent should read as corrected below.

Column 1, line 66, for "operating" read -- operation --; column 3, line 74, after "on the" insert -- $2^{0}$ --.

Signed and sealed this 10th day of July 1962.

(SEAL)
Attest:

ERNEST W. SWIDER
Attesting Officer

DAVID L. LADD
Commissioner of Patents